(12) United States Patent
Chen

(10) Patent No.: US 10,891,195 B2
(45) Date of Patent: *Jan. 12, 2021

(54) STORAGE SYSTEM WITH DIFFERENTIAL SCANNING OF NON-ANCESTOR SNAPSHOT PAIRS IN ASYNCHRONOUS REPLICATION

(71) Applicant: EMC IP Holding Company LLC, Hopkinton, MA (US)

(72) Inventor: Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/357,957

(22) Filed: Mar. 19, 2019

(65) Prior Publication Data
US 2020/0301784 A1 Sep. 24, 2020

(51) Int. Cl.
*G06F 11/14* (2006.01)
*G06F 3/06* (2006.01)
(Continued)

(52) U.S. Cl.
CPC ........ *G06F 11/1451* (2013.01); *G06F 3/0604* (2013.01); *G06F 3/065* (2013.01); *G06F 3/067* (2013.01); *G06F 11/1464* (2013.01); *G06F 16/9027* (2019.01); *G06F 8/658* (2018.02); *G06F 2201/84* (2013.01)

(58) Field of Classification Search
CPC .. G06F 11/1451; G06F 11/1464; G06F 3/065; G06F 3/0604; G06F 3/067; G06F 16/9027; G06F 8/658; G06F 2201/84
See application file for complete search history.

(56) References Cited

U.S. PATENT DOCUMENTS 6,317,754 B1* 11/2001 Peng ................... H04L 29/06
707/610
7,444,464 B2 10/2008 Urmston et al.
(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Ramon A. Mercado
(74) *Attorney, Agent, or Firm* — Ryan, Mason & Lewis, LLP

(57) ABSTRACT

An apparatus is configured to generate a current snapshot set for a consistency group comprising a plurality of storage volumes subject to replication from a source storage system to a target storage system, and to schedule a differential scan of the current snapshot set relative to a previous snapshot set generated for the consistency group. For each of one or more snapshot trees maintained for the consistency group, a determination is made as to whether or not a first node corresponding to the previous snapshot set is an ancestor of a second node corresponding to the current snapshot set, and a manner in which an instance of the differential scan is performed for the snapshot tree is altered responsive to a result of the determination.

20 Claims, 7 Drawing Sheets

(51) Int. Cl.
　　　*G06F 16/901* 　　(2019.01)
　　　*G06F 8/658* 　　(2018.01)

(56) References Cited

U.S. PATENT DOCUMENTS

| | | | |
|---|---|---|---|
| 8,095,726 | B1 | 1/2012 | O'Connell et al. |
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 10,592,161 | B1 * | 3/2020 | Chen .................. G06F 3/067 |
| 10,630,716 | B1 * | 4/2020 | Ghosh ................. H04L 63/20 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

\* cited by examiner

STORAGE SYSTEM WITH DIFFERENTIAL SCANNING OF NON-ANCESTOR SNAPSHOT PAIRS IN ASYNCHRONOUS REPLICATION

FIELD

The field relates generally to information processing systems, and more particularly to storage in information processing systems.

BACKGROUND

Many information processing systems are configured to replicate data from one storage system to another storage system, possibly at different physical sites. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Storage systems participating in a replication process can therefore each be configured to support both asynchronous and synchronous replication modes.

Conventional approaches to data replication can be problematic under certain conditions. For example, it can be difficult to perform differential scanning between certain types of pairs of snapshots generated for a given replication consistency group of multiple storage volumes that is subject to an ongoing asynchronous replication process involving source and target storage systems.

SUMMARY

Illustrative embodiments provide a storage system with functionality for improved differential scanning between pairs of snapshots generated for a consistency group of multiple storage volumes that is subject to an ongoing asynchronous replication process involving source and target storage systems. For example, some embodiments provide efficient differential scanning of non-ancestor snapshots of a snapshot tree of the consistency group as part of the ongoing asynchronous replication process. A given such pair of "non-ancestor" snapshots illustratively comprises a snapshot pair in which a first snapshot is not an ancestor of a second snapshot in the snapshot tree.

The source and target storage systems are illustratively implemented as respective content addressable storage systems, although other types of storage systems can be used in other embodiments.

In one embodiment, an apparatus comprises at least one processing device comprising a processor coupled to a memory. The at least one processing device is configured to generate a current snapshot set for a consistency group comprising a plurality of storage volumes subject to replication from a source storage system to a target storage system, and to schedule a differential scan of the current snapshot set relative to a previous snapshot set generated for the consistency group. For each of one or more snapshot trees maintained for the consistency group, a determination is made as to whether or not a first node corresponding to the previous snapshot set is an ancestor of a second node corresponding to the current snapshot set, and a manner in which an instance of the differential scan is performed for the snapshot tree is altered responsive to a result of the determination.

Altering a manner in which an instance of the differential scan is performed for the snapshot tree responsive to a result of the determination in some embodiments comprises performing a first type of differential scan comprising aggregating node metadata of a path from the second node to the first node responsive to the first node being an ancestor of the second node, and performing a second type of differential scan different than the first type of differential scan responsive to the first node not being an ancestor of the second node.

The second type of differential scan in some embodiments comprises identifying a first path from the first node to a root node, identifying a second path from the second node to the root node, determining a lowest common ancestor between the first and second paths, combining the first and second paths at the lowest common ancestor, and aggregating node metadata of the combined first and second paths.

The processing device in some embodiments is part of the source storage system, and more particularly implements at least a portion of a storage controller of the source storage system, although numerous alternative implementations are possible. For example, in other embodiments the processing device is implemented at least in part in a host device configured to communicate over a network with the source and target storage systems. Again, these are only examples, and alternative implementations are possible.

A given one of the storage volumes illustratively comprises one or more logical storage volumes each comprising at least a portion of a physical storage space of one or more storage devices. The term "storage volume" as used herein is therefore intended to be broadly construed, so as to encompass a set of one or more logical storage volumes.

The replication of the consistency group illustratively comprises asynchronous replication of the consistency group carried out over a plurality of asynchronous replication cycles. In such an arrangement, scheduling the differential scan illustratively comprises scheduling the differential scan for a given one of the replication cycles. The instance of the differential scan is assumed to be performed in the given replication cycle of the asynchronous replication of the consistency group, and results of performing the instance of the differential scan are assumed to be transmitted from the source storage system to the target storage system in the given replication cycle, although other arrangements are possible.

In some embodiments, a given one of the snapshot trees corresponding to a particular one of the storage volumes comprises a root node, one or more branch nodes, and a plurality of leaf nodes. A given one of the branch nodes illustratively represents a particular version of the storage volume from which a corresponding snapshot is taken. In such an arrangement, a first one of the leaf nodes which is a child of the given branch node represents a subsequent version of the storage volume, and a second one of the leaf nodes which is a child of the given branch node comprises the corresponding snapshot providing a point-in-time copy of the particular version of the storage volume. A wide variety of other types of snapshot trees having different node configurations can be used in other embodiments.

The source storage system in some embodiments comprises a clustered implementation of a content addressable storage system having a distributed storage controller. The content addressable storage system in arrangements of this type is illustratively configured to utilize non-volatile memory storage devices, such as flash-based storage devices. For example, the storage devices of the source storage system in such embodiments can be configured to collectively provide an all-flash storage array. The target storage system can similarly comprise an all-flash storage array, or another type of content addressable storage system. Numerous other storage system arrangements are possible in other embodiments. Content addressable storage is therefore not required.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
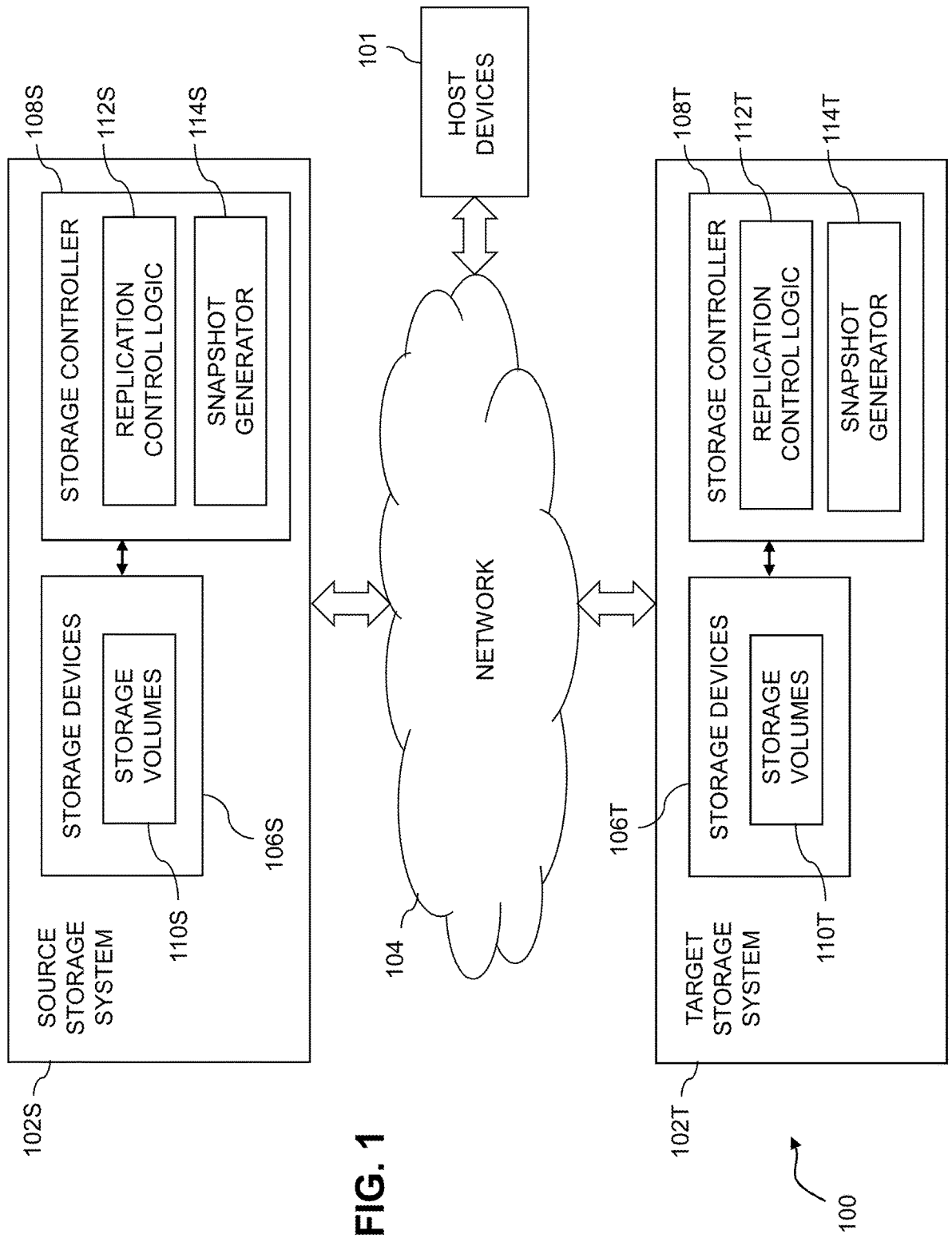
FIG. 1 is a block diagram of an information processing system comprising source and target storage systems configured with functionality for differential scanning of non-ancestor snapshot pairs in asynchronous replication in an illustrative embodiment.

FIG. 1 shows an information processing system 100 configured in accordance with an illustrative embodiment. The information processing system 100 comprises a plurality of host devices 101, a source storage system 102S and a target storage system 102T, all of which are configured to communicate with one another over a network 104. The source and target storage systems 102 are more particularly configured in this embodiment to participate in an asynchronous replication process in which one or more storage volumes are asynchronously replicated from the source storage system 102S to the target storage system 102T, possibly with involvement of at least one of the host devices 101. The one or more storage volumes that are asynchronously replicated from the source storage system 102S to the target storage system 102T are illustratively part of a designated consistency group.

Each of the storage systems 102 is illustratively associated with a corresponding set of one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (IO) operations that are processed by a corresponding one of the storage systems 102. The term "input-output" as used herein refers to at least one of input and output. For example, IO operations may comprise write requests and/or read requests directed to stored data of a given one of the storage systems 102.

The storage systems 102 illustratively comprise respective processing devices of one or more processing platforms. For example, the storage systems 102 can each comprise one or more processing devices each having a processor and a memory, possibly implementing virtual machines and/or containers, although numerous other configurations are possible.

The storage systems 102 can additionally or alternatively be part of cloud infrastructure such as an Amazon Web Services (AWS) system. Other examples of cloud-based systems that can be used to provide at least portions of the storage systems 102 include Google Cloud Platform (GCP) and Microsoft Azure.

The storage systems 102 may be implemented on a common processing platform, or on separate processing platforms.

The host devices 101 are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The source storage system 102S comprises a plurality of storage devices 106S and an associated storage controller 108S. The storage devices 106S store storage volumes 110S. The storage volumes 110S illustratively comprise respective logical units (LUNs) or other types of logical storage volumes.

Similarly, the target storage system 102T comprises a plurality of storage devices 106T and an associated storage controller 108T. The storage devices 106T store storage volumes 110T, at least a portion of which represent respective LUNs or other types of logical storage volumes that are replicated from the source storage system 102S to the target storage system 102T in accordance with an asynchronous replication process.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, at least one of the storage systems 102 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems 102 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 102 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, communications between the host devices 101 and the storage systems 102 comprise Small Computer System Interface (SCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

The storage controller 108S of source storage system 102S in the FIG. 1 embodiment includes replication control logic 112S and a snapshot generator 114S.

Similarly, the storage controller 108T of target storage system 102T includes replication control logic 112T and a snapshot generator 114T.

Although not explicitly shown in the figure, additional components can be included in the storage controllers 108, such as signature generators utilized in generating content-based signatures of data pages.

The instances of replication control logic 112S and 112T are collectively referred to herein as replication control logic 112. Such replication control logic instances are also referred to herein as individually or collectively comprising at least a portion of a "replication engine" of the system 100.

The replication control logic 112 of the storage systems 102 controls performance of the asynchronous replication process carried out between those storage systems, which as noted above in some embodiments further involves at least one of the host devices 101. The data replicated from the source storage system 102S to the target storage system 102T can include all of the data stored in the source storage system 102S, or only certain designated subsets of the data stored in the source storage system 102S, such as particular designated sets of LUNs or other logical storage volumes. Different replication processes of different types can be implemented for different parts of the stored data. Also, the storage systems 102 can be configured to operate in different replication modes of different types at different times. For example, the storage systems 102 can transition from an asynchronous replication mode to a synchronous replication mode and vice versa.

A given storage volume designated for replication from the source storage system 102S to the target storage system 102T illustratively comprises a set of one or more LUNs or other instances of the storage volumes 110S of the source storage system 102S. Each such LUN or other storage volume illustratively comprises at least a portion of a physical storage space of one or more of the storage devices 106S. The corresponding replicated LUN or other storage volume of the storage volumes 110T of the target storage system 102T illustratively comprises at least a portion of a physical storage space of one or more of the storage devices 106T.

Figure 2:
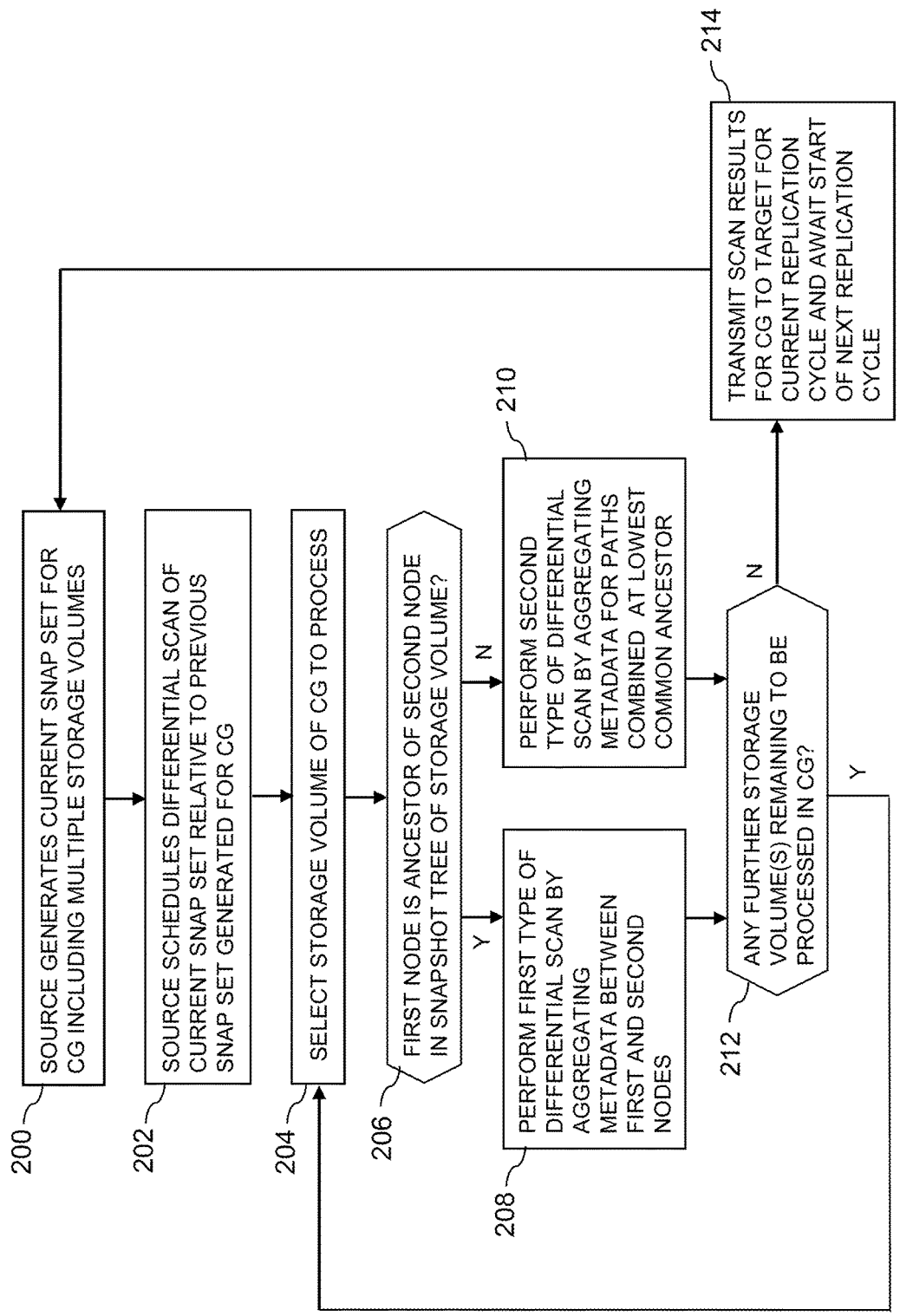
FIG. 2 is a flow diagram of a process for differential scanning of non-ancestor snapshot pairs in asynchronous replication in an illustrative embodiment.

The replication control logic 112 of the storage systems 102 in some embodiments is configured to control the performance of corresponding portions of an asynchronous replication process of the type illustrated in the flow diagram of FIG. 2. At least one of the host devices 101 in some embodiments can also include one or more instances of replication control logic and possibly also one or more snapshot generators, as well as additional or alternative components such as a signature generator.

The storage controllers 108 of the storage systems 102 should also be understood to include additional modules and other components typically found in conventional implementations of storage controllers and storage systems, although such additional modules and other components are omitted from the figure for clarity and simplicity of illustration.

It will be assumed for the following description of the FIG. 1 embodiment that there is an ongoing asynchronous replication process being carried out between the source storage system 102S and the target storage system 102T in the system 100, utilizing their respective instances of replication control logic 112S and 112T.

The asynchronous replication process more particularly comprises a cycle-based asynchronous replication process in which a consistency group comprising one or more storage volumes is replicated from the source storage system 102S to the target storage system 102T over a plurality of asynchronous replication cycles. Such an arrangement is illustratively configured to guarantee data consistency between the storage volumes of the consistency group on the source and their corresponding replicated versions on the target. The asynchronous replication is performed periodically over the multiple cycles. The asynchronous replication is illustratively implemented at least in part by or otherwise under the control of the source and target instances of replication control logic 112S and 112T. Other types of replication arrangements can be used in other embodiments.

The source storage system 102S generates a current snapshot set for a consistency group comprising a plurality of storage volumes subject to replication from the source storage system 102S to the target storage system 102T, and schedules a differential scan of the current snapshot set relative to a previous snapshot set generated for the consistency group. The term "scheduling" as used herein is intended to be broadly construed, so as to encompass, for example, initiating, triggering or otherwise controlling performance of a differential scan in conjunction with a given replication cycle of the asynchronous replication of the consistency group. Scheduling the differential scan in some embodiments therefore comprises scheduling the differential scan for the given replication cycle of the asynchronous replication.

It is assumed for the present embodiment that the given replication cycle is a non-initial replication cycle of an ongoing asynchronous replication process, such that there is a previous snapshot set already available from a previous cycle. In an initial replication cycle, the entire content of the current snapshot set is illustratively transferred to from the source to the target, and differential scanning is not utilized. The current snapshot set for the initial replication cycle becomes the previous snapshot set for the next replication cycle.

The current snapshot set and other snapshot sets referred to the context of some embodiments herein are illustratively generated for a consistency group that comprises multiple storage volumes. A snapshot tree of the consistency group in such embodiments illustratively comprises multiple individual snapshot trees for respective ones of the storage volumes, each generally having the same topology of nodes. Accordingly, generation of a snapshot set for a consistency group illustratively comprises generating a plurality of snapshots for respective ones of the multiple storage volumes. Such snapshot sets and associated versions of the consistency group vary over time and are represented by nodes of the snapshot tree of the consistency group. Again, the snapshot tree for the consistency group may be viewed as illustratively comprising multiple superimposed snapshot trees for the respective storage volumes of the consistency group with each such storage volume snapshot tree having substantially the same topology as the consistency group snapshot tree.

A given one of the snapshot trees corresponding to a particular one of the storage volumes more particularly comprises a root node, at least one branch node, and a plurality of leaf nodes, with a given one of the branch nodes representing a particular version of the storage volume from which a corresponding snapshot is taken. A first one of the leaf nodes which is a child of the given branch node represents a subsequent version of the storage volume, and a second one of the leaf nodes which is a child of the given branch node comprises the corresponding snapshot providing a point-in-time (PIT) copy of the particular version of the storage volume.

Illustrative examples of consistency group snapshot trees of the type described above are shown in FIGS. 3A and 3B, and will be described in greater detail below in conjunction with the flow diagram of FIG. 2.

In some embodiments, the snapshot trees comprise or are otherwise associated with additional information also arranged in the form of a tree structure. For example, a given one of the snapshot trees may be associated with one or more additional trees including at least one of a "dirty" tree that characterizes updates to logical addresses of the corresponding storage volume, and a hash tree comprising content-based signatures of respective ones of the logical addresses of the corresponding storage volume. All nodes of a given snapshot tree in some embodiments, including both branch nodes and leaf nodes, may each be associated with corresponding metadata of both a dirty tree and a hash tree.

An instance of the differential scan performed for the given snapshot tree in embodiments of this type can further comprise aggregating information of at least one of the dirty tree and the hash tree between start and stop nodes of the given snapshot tree. The start and stop nodes are examples of what are more generally referred to herein as first and second nodes corresponding to respective current and previous snapshot sets. Start and stop nodes can comprise branch nodes or leaf nodes associated with those branch nodes. Also, a given one of the first and second nodes can comprise a leaf node rather than a branch node. Terms such as "start node," "stop node," "first node" and "second node" are therefore intended to be broadly construed, and should not be viewed as being restricted to either branch nodes or leaf nodes.

A wide variety of other types of snapshot trees and possibly one or more associated additional trees can be used in other embodiments. Also, the term "tree" as used herein is intended to be broadly construed so as to comprise any type of data structure characterizing a plurality of nodes and a plurality of edges interconnecting respective pairs of the nodes.

The content-based signatures of the above-noted hash tree associated with a given storage volume in some embodiments comprise hash digests of their respective pages, each generated by application of a hash function such as the well-known Secure Hashing Algorithm 1 (SHA1) to the content of its corresponding page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

In embodiments in which the storage systems 102 comprise content addressable storage systems, address metadata is illustratively utilized to provide content addressable storage functionality within those systems. The address metadata in some embodiments comprises at least a portion of one or more logical layer mapping tables that map logical addresses of respective ones of the data pages of the storage volume to corresponding content-based signatures of the respective data pages. Examples of logical layer mapping tables and other metadata structures maintained by at least the storage controller 108T of target storage system 102T will be described elsewhere herein.

The manner in which the source storage system 102S processes the snapshot trees of respective storage volumes in conjunction with asynchronous replication of the consistency group will now be described in further detail.

For each of one or more snapshot trees maintained for the consistency group, the source storage system 102S determines if a first node corresponding to the previous snapshot set is an ancestor of a second node corresponding to the current snapshot set. The source storage system 102S then alters a manner in which an instance of the differential scan is performed for the snapshot tree responsive to a result of the determination. The first and second nodes may comprise, for example, respective branch nodes of the snapshot tree. Alternatively, at least one of the first and second nodes may comprise a leaf node.

In some embodiments, for example, the current snapshot set is derived from a restored version of at least a portion of the consistency group, such that the first node corresponding to the previous snapshot set is not an ancestor of the second node corresponding to the current snapshot set. Such situations can arise, for example, when one or more storage volumes have been restored to previous versions during an ongoing replication process. Illustrative embodiments advantageously allow efficient differential scanning to be performed in these and other situations in which the first node is not an ancestor of the second node.

Determining if the first node corresponding to the previous snapshot set is an ancestor of the second node corresponding to the current snapshot set in some embodiments more particularly comprises inspecting a path from the second node towards a root node of the snapshot tree. Responsive to the first node being part of the path, a determination is made that the first node is an ancestor of the second node. Responsive to the first node not being part of the path, a determination is made that the first node is not an ancestor of the second node. The first node is illustratively considered "part of the path" if it is encountered in traversing the path, and is otherwise not considered "part of the path."

In some embodiments, altering a manner in which an instance of the differential scan is performed for the snapshot tree responsive to a result of the determination includes performing a first type of differential scan comprising aggregating node metadata of a path from the second node to the first node responsive to the first node being an ancestor of the second node, and performing a second type of differential scan different than the first type of differential scan responsive to the first node not being an ancestor of the second node. For example, the second type of differential scan illustratively comprises identifying a first path from the first node to a root node, identifying a second path from the second node to the root node, determining a lowest common ancestor between the first and second paths, combining the first and second paths at the lowest common ancestor, and aggregating node metadata of the combined first and second paths.

In the above-described instance of the differential scan, the aggregated metadata is utilized to determine all changed data pages of each storage volume of the consistency group between the current and previous snapshot sets. The resulting differential data is provided from the source storage system 102S to the target storage system 102T.

The instance of the differential scan is therefore illustratively performed by the source storage system 102S in the given replication cycle of the asynchronous replication of the consistency group. In addition, results of performing the instance of the differential scan are transmitted from the source storage system 102S to the target storage system in the given replication cycle.

As mentioned previously, the term "storage volume" as used herein is intended to be broadly construed, and should not be viewed as being limited to any particular format or configuration. The term "consistency group" as used herein is also intended to be broadly construed, and may comprise one or more storage volumes.

A more particular example of the differential scanning functionality described above will now be presented. In this example, the replication control logic instances 112S and 112T are assumed to cooperate to facilitate differential scanning of non-ancestor snapshot pairs in conjunction with ongoing asynchronous replication of a consistency group from the source to the target. Like other embodiments herein, the process utilized in the present example advantageously provides efficient differential scanning even in those situations in which one or more storage volumes have been subject to restoration from a previous snapshot as part of an ongoing asynchronous replication process.

Figure 3A:
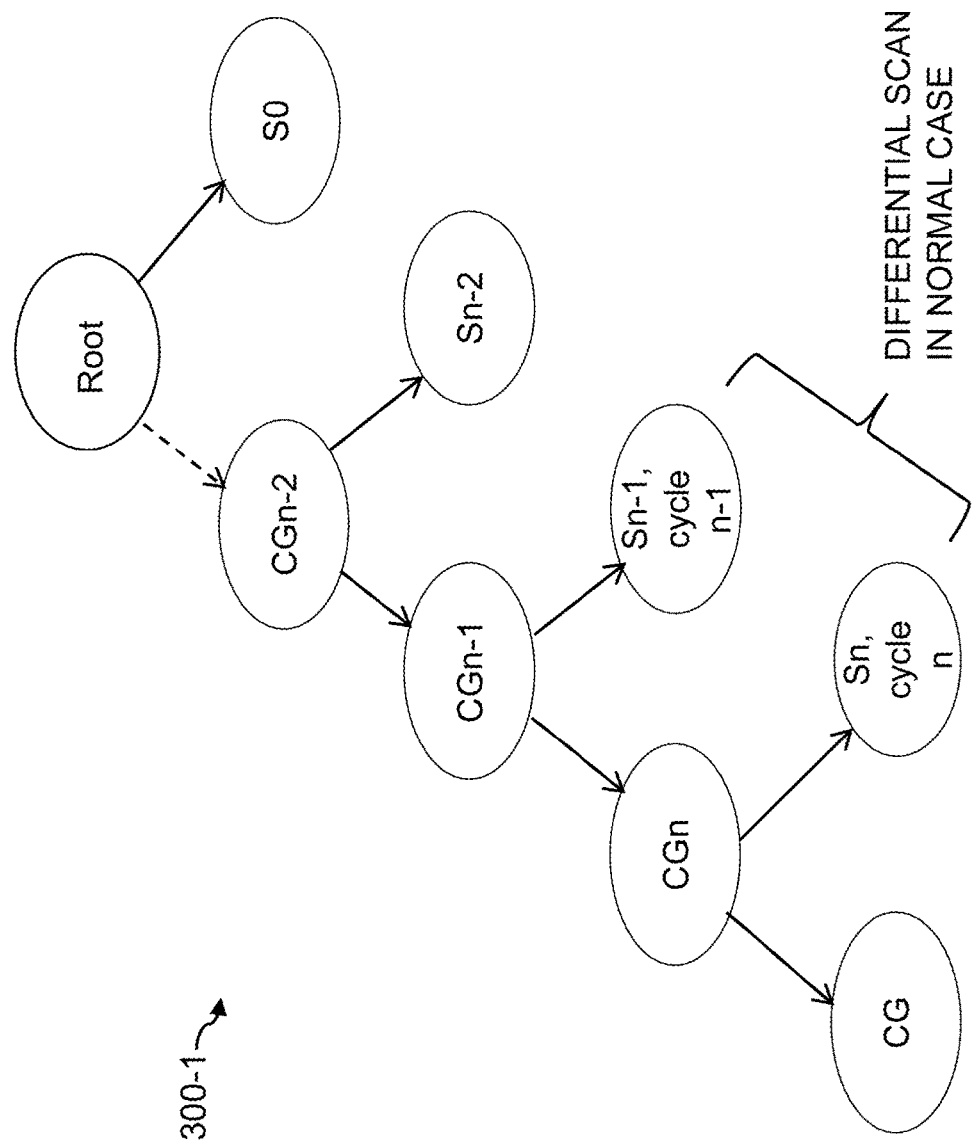
FIGS. 3A and 3B show examples of snapshot trees subject to respective normal and refreshed differential scan instances for a given storage volume in an illustrative embodiment.

In the present example, it is assumed that the source and target storage systems 102 are configured via their respective instances of replication control logic 112 to perform efficient differential scanning in situations in which the first node is an ancestor of the second node, including the situation illustrated in FIG. 3A. The efficient differential scanning generally involves aggregating node metadata between the first and second nodes, using the above-described dirty trees and hash trees which fully characterize any data changes between the corresponding snapshots. Such node metadata provides all the information needed to perform the differential scanning in a particularly efficient manner, thereby enhancing the performance of the overall asynchronous replication process.

Figure 3B:
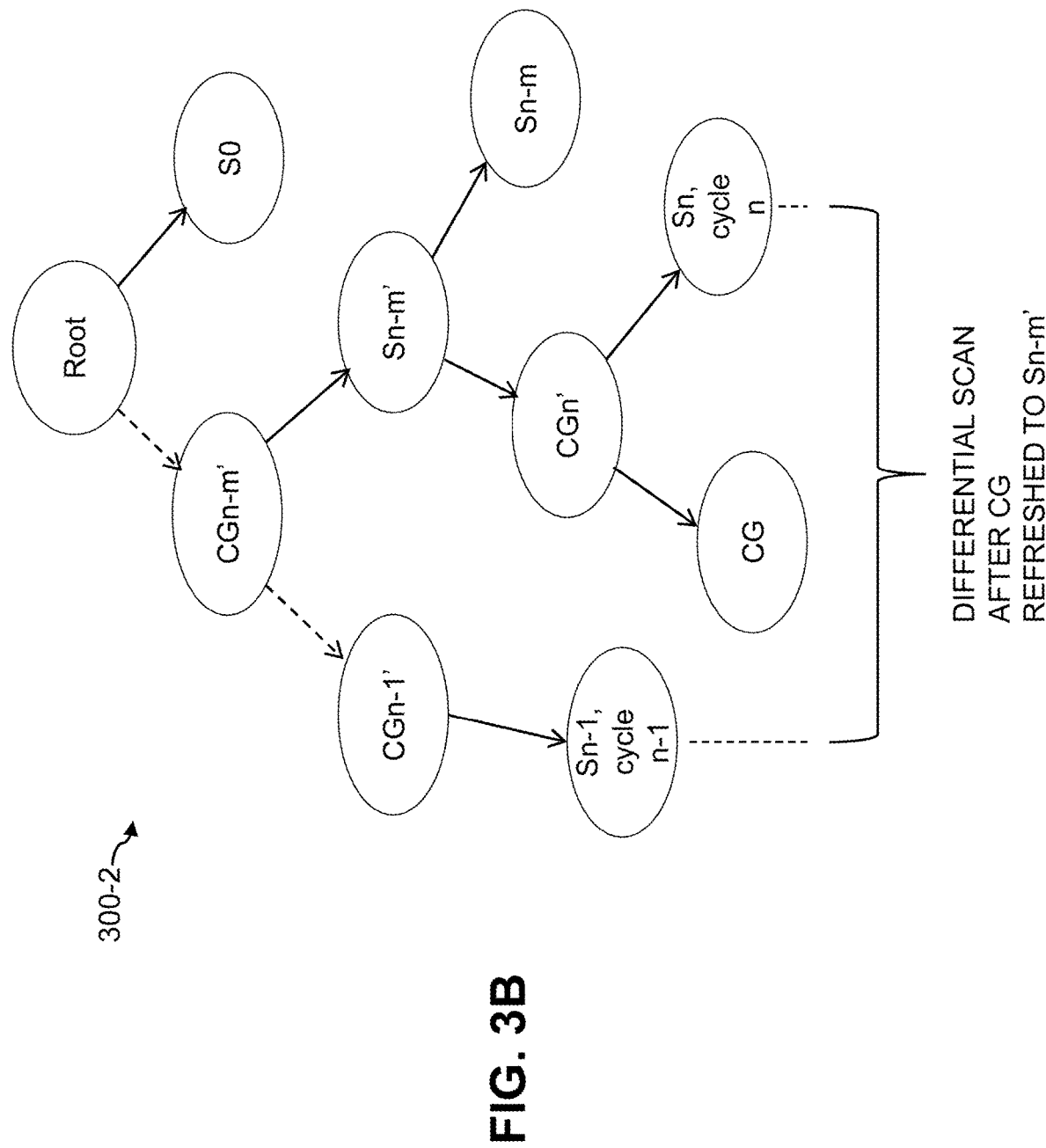

The illustrative embodiments allow such efficient differential scanning to also be performed even in those situations in which the first node is not an ancestor of the second node, including the situation illustrated in FIG. 3B. This includes situations in which one or more storage volumes of the consistency group are "refreshed" or otherwise restored to previous versions during the ongoing asynchronous replication process, also referred to herein as "live" restoration of the one or more storage volumes.

Accordingly, illustrative embodiments can provide efficient differential scanning between any two snapshots in a snapshot tree, regardless of whether or not the two snapshots are an ancestor snapshot pair or a non-ancestor snapshot pair.

The process in the present example includes the following steps:

1. Determine whether or not a first node corresponding to a previous snapshot of a previous snapshot set generated for a consistency group is an ancestor of a second node corresponding to a current snapshot of a current snapshot set generated for the consistency group. This illustratively involves following a node chain from the second node towards the root node. If the root node is reached from the second node without encountering the first node on the node chain, the first node is not an ancestor of the second node.

2. If the first node is an ancestor of the second node, aggregate the node metadata between the first and second nodes including information provided by the corresponding dirty tree and hash tree. For example, such aggregation can involve first aggregating the dirty tree metadata of a node chain from the first node to the second node to identify any changed data pages of the one or more storage volumes and then "walking up" the node chain to determine the corresponding hash handles of the changed pages from the hash tree metadata. Other aggregation techniques can be used in other embodiments.

3. If the first node is not an ancestor of the second node, determine the lowest common ancestor for node chains between the first node and the root node and between the second node and the root node. Such node chains are also referred to herein as respective "paths" from the first and second nodes to the root node. The lowest common ancestor is a node that is on both of the node chains. A new node chain is then formed by combining the two node chains at the lowest common ancestor. The node metadata of the combined first and second node chains is then aggregated, illustratively by first aggregating the dirty tree metadata of the new node chain from the first node to the second node to identify any changed data pages of the one or more storage volumes and then "walking up" the snapshot tree from the second node to the root node over at least a portion of the new node chain in order to determine the corresponding hash handles from the hash tree metadata of the changed pages. As a more particular example, the dirty tree metadata is illustratively used to create a differential bitmap that indicates which of the pages of the storage volume have changed since the previous snapshot was taken, and the hash handles of those changed pages are then determined from the hash tree metadata. Again, other aggregation techniques can be used in other embodiments.

In the above example, the process steps are assumed to be performed primarily by the source storage system 102S operating in cooperation with the target storage system 102T via a replication engine comprising their respective replication control logic instances 112S and 112T. Other arrangements of process steps can be used in other embodiments. Also, the particular ordering of the steps shown above can be varied.

The above-described illustrative embodiments include examples of differential scanning of non-ancestor snapshot pairs in ongoing asynchronous replication. Such arrangements illustratively allow differential scanning to proceed in an efficient manner even in those situations in which one or more storage volumes have been restored using corresponding previous snapshots during an ongoing replication process. For example, such arrangements avoid the need to terminate and subsequently restart the ongoing replication process in order to restore one or more storage volumes of a consistency group using previous versions.

As indicated previously, these and other operations carried out in conjunction with a process for differential scanning of non-ancestor snapshot pairs in asynchronous replication are illustratively performed at least in part under the control of the replication control logic 112.

The storage systems 102 in the FIG. 1 embodiment are assumed to be implemented using at least one processing platform each comprising one or more processing devices each having a processor coupled to a memory. Such processing devices can illustratively include particular arrangements of compute, storage and network resources.

The storage systems 102 may be implemented on respective distinct processing platforms, although numerous other arrangements are possible. At least portions of their associated host devices may be implemented on the same processing platforms as the storage systems 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 102 to reside in different data centers. Numerous other distributed implementations of the storage systems 102 and their respective associated sets of host devices are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, storage systems 102, network 104, storage devices 106, storage controllers 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, at least portions of the above-described functionality for differential scanning of non-ancestor snapshot pairs in asynchronous replication can be implemented in one or more host devices, or partially in a host device and partially in a storage system. Illustrative embodiments are not limited to arrangements in which all such functionality is implemented in source and target storage systems or a host device, and therefore encompass various hybrid arrangements in which the functionality is distributed over one or more storage systems and one or more associated host devices, each comprising one or more processing devices. References herein to "one or more processing devices" configured to implement particular operations or other functionality should be understood to encompass a wide variety of different arrangements involving one or more processing devices of at least one storage system and/or at least one host device.

As another example, it is possible in some embodiments that the source storage system and the target storage system can comprise different portions of the same storage system. In such an arrangement, a replication process is illustratively implemented to replicate data from one portion of the storage system to another portion of the storage system. The terms "source storage system" and "target storage system" as used herein are therefore intended to be broadly construed so as to encompass such possibilities.

The operation of the information processing system 100 will now be described in further detail with reference to the flow diagram of the illustrative embodiment of FIG. 2, which implements an asynchronous replication process. The steps of the process illustratively involve interactions between a source storage system and a target storage system, referred to as respective "source" and "target" in these figures, illustratively utilizing replication control logic instances and snapshot generators of storage controllers of the source and target. For example, replication control logic of the source interacts with replication control logic of the target in performing multiple cycles of asynchronous replication for a consistency group. It is possible in other embodiments that at least one of the storage systems does not include replication control logic and a snapshot generator, and in such embodiments these components are instead implemented in one or more host devices.

The asynchronous replication process as illustrated in FIG. 2 includes steps 200 through 214, and is suitable for use in system 100 but is more generally applicable to other types of information processing systems in which data is replicated from source to target. Also, the roles of source and target can be reversed, as in a situation in which a failover from source to target occurs.

In step 200, the source generates a current snapshot set ("snap set") for a consistency group (CG) comprising multiple storage volumes. The consistency group is subject to cycle-based asynchronous replication from the source to the target. The term "snapshot set" as used herein is intended to be broadly construed, and in some embodiments a given snapshot set can include only a single snapshot. Also, a consistency group in some embodiments can comprise only a single storage volume or other type of storage object.

In step 202, the source schedules a differential scan of the current snap set relative to a previous snap set generated for the consistency group. The differential scan is illustratively utilized to generate differential data, also referred to as representing a "delta" between the two snap sets, for communication from source to target in a given replication cycle of the cycle-based asynchronous replication process.

In step 204, a particular storage volume of the consistency group is selected for processing. In an initial iteration of this step of the FIG. 2 process, an initial storage volume of the consistency group is illustratively selected, and other storage volumes of the consistency group are similarly selected in respective subsequent iterations until all storage volumes of the consistency group have been processed.

In step 206, a determination is made as to whether or not a first node corresponding to a previous snapshot of the selected storage volume is an ancestor of a second node corresponding to a current snapshot of the selected storage volume. The first and second nodes illustratively comprise respective branch nodes in a snapshot tree of the selected storage volume, although at least one of the first and second nodes could comprise a leaf node. If the first node is an ancestor of the second node in the snapshot tree, the process moves to step 208, and otherwise moves to step 210 as indicated.

In step 208, a first type of differential scan is performed by aggregating node metadata between the first and second nodes in the manner described elsewhere herein. The process then moves to step 212.

FIG. 3A shows an example of a snapshot tree 300-1 for the consistency group that includes the selected storage volume. Such a snapshot tree illustratively represents a combination of multiple superimposed snapshot trees for respective ones of the storage volumes of the consistency group, with each of the storage volume snapshot trees having substantially the same format as the snapshot tree 300-1. Thus, although the snapshot tree format illustrated in the figure is for a consistency group, it is also representative of multiple individual snapshot trees for respective storage volumes of the consistency group. A given such snapshot tree for the selected storage volume is subject to the first type of differential scan in step 208.

The snapshot tree 300-1 comprises a root node and a plurality of branch nodes denoted CGn−2, CGn−1, CGn and CG. The root node represents a version of the consistency group from which an initial PIT copy is captured as snapshot set S0. The branch nodes CGn−2, CGn−1 and CGn represent subsequent versions of the consistency group from which respective PIT copies are captured as subsequent snapshot sets Sn−2, Sn−1 and Sn, as the storage volumes of the consistency group change over time responsive to execution of 10 operations. The snapshot sets Sn−1 and Sn are associated with respective previous and current replication cycles denoted as cycle n−1 and cycle n.

A given storage volume snapshot tree having a format of the type shown in FIG. 3A represents a storage volume and its snapshots over time. Each leaf node represents a particular version of the storage volume or a snapshot of the storage volume, and each branch node represents a shared ancestor between a version of the storage volume, a snapshot of the storage volume, or a child branch node. When a given snapshot of the storage volume is created, two child leaf nodes are created, one representing new updates to the storage volume after creation of the snapshot, and the other representing the snapshot. The volume node from which the snapshot was created therefore becomes a branch node in the snapshot tree. When a given snap set of the consistency group is created for its member storage volumes, two new leaf nodes are created in each of the snapshot trees of the respective storage volumes.

The given storage volume snapshot tree having a format of the type shown in FIG. 3A illustratively corresponds to a particular storage volume that has not been subject to live restoration during the replication process. The instance of the differential scan performed in step 208 in this example utilizes as its start node the non-root node corresponding to snapshot set Sn−1 of the previous replication cycle and utilizes as its stop node the non-root node corresponding to snapshot set Sn of the current cycle. These start and stop nodes are associated with respective branch nodes CGn−1 and CGn. References herein to first and second nodes in illustrative embodiments refer to respective branch nodes of a snapshot tree. A given such branch node generally has at least one corresponding leaf node. It is also possible that at least one of the first and second nodes can alternatively comprise a leaf node.

In step 210, a second type of differential scan is performed by aggregating node metadata for paths combined at a lowest common ancestor in the manner described elsewhere herein. The process then moves to step 212. It is to be appreciated that terms such as "aggregating" and "aggregate" as used herein are intended to be broadly construed, and can include multiple different types of aggregation, such as aggregation of dirty tree metadata followed by aggregation of hash tree metadata, with each such aggregation type possibly proceeding in different directions through at least portions of a given node chain and in some cases involving different node chains potentially having different sets of nodes.

FIG. 3B shows an example of a snapshot tree 300-2 that is subject to the second type of differential scan in step 210. The snapshot tree 300-2 has a structure similar to that of snapshot tree 300-1, but the consistency group was "refreshed" or otherwise restored to a previous version corresponding to snapshot set Sn−m' during the ongoing replication process. In this example, snapshot set Sn−1 represents a previous snapshot set generated for the consistency group in replication cycle n−1. It is apparent that, at some point after generation of the snapshot set Sn−1, the consistency group was restored using snapshot set Sn−m' which was generated from the version of the consistency group represented by branch node CGn−m'. Snapshot set Sn−m is a snapshot set generated from the consistency group as restored using snapshot set Sn−m'. Branch node CGn' represents a version of the consistency group subsequent to the restoration, from which snapshot set Sn is generated in cycle n of the replication process. Any changes to the storage volumes of the consistency group after generation of snapshot set Sn are reflected in the current version denoted by node CG.

The snapshot set Sn in this example is therefore a current snapshot set, and the snapshot set Sn−1 is a previous snapshot set, but the branch node CGn−1' corresponding to the previous snapshot set Sn−1 is not an ancestor of the branch node CGn' corresponding to the current snapshot set Sn. The branch nodes CGn−1' and CGn' are representative of what are more generally referred to herein as respective first and second nodes corresponding to respective previous and current snapshot sets.

As indicated above, the second type of differential scan performed in step 210 in this example combines paths from the first node to the root node and from the second node to the root node, at a lowest common ancestor illustratively represented by the branch node CGn−m' in this example, and aggregates node metadata for the combined path in the manner described elsewhere herein.

A combined path for aggregation of node metadata in the FIG. 3B example illustratively comprises the branch nodes CGn−1', . . . CGn−m', Sn−m', and CGn'. The combined path in some embodiments can additionally include the leaf nodes Sn−1 and Sn corresponding to respective branch nodes CGn−1' and CGn'. In some implementations, this combined path is used for aggregation of dirty tree metadata, and a different combined path is used for aggregation of hash tree metadata. For example, the hash tree metadata is illustratively aggregated along a combined path that includes nodes CGn', Sn−m', CGn−m' . . . Root. Numerous other arrangements are possible.

Terms such as "root node" and "non-root node," "start node" and "stop node," and "first node" and "second node" as used herein are all intended to be broadly construed. A non-root node is considered to be any snapshot tree node that is not a root node. Start node and stop node designations for a given snapshot tree in some embodiments can be reversed relative to the designation arrangements referred to above in conjunction with the examples of FIGS. 3A and 3B. Accordingly, such terms should not be construed as requiring a particular directionality for scanning the snapshot tree. It should also be understood that a wide variety of other snapshot tree arrangements may be used.

In step 212, a determination is made as to whether or not there is at least one storage volume remaining to be processed in the consistency group. If there is at least one storage volume remaining to be processed, the FIG. 2 process returns to step 204 to select the next storage volume. Otherwise, the process moves to step 214 as shown.

In step 214, which is reached only after all of the storage volumes of the consistency group have been processed, the scan results for the consistency group are transmitted to the target for the current replication cycle. As noted previously herein, the scan results illustratively comprise differential data or a "delta" between the current snap set and the previous snap set for the consistency group. The target utilizes this differential data to keep its version of the replicated consistency group consistent with that of the source as reflected in the current snap set generated in step 200. Data consistency checks are illustratively performed to ensure that the data was properly replicated, and any storage volume failing such a consistency check can be recovered using various techniques.

The process then awaits the start of the next replication cycle, at which time the process returns to step 200 to generate another snap set comprising snapshot trees for respective storage volumes of the consistency group.

The FIG. 2 process is an example of what is more generally referred to herein as a differential scanning approach that supports efficient differential scanning of non-ancestor snapshots in asynchronous replication.

Such differential scanning arrangements allow for efficient differential scanning of non-ancestor snapshots that can arise when one or more storage volumes are restored from previous snapshots in an ongoing asynchronous replication process.

The particular processing operations and other system functionality described in conjunction with the flow diagram of FIG. 2 are presented by way of illustrative example only, and should not be construed as limiting the scope of the disclosure in any way. Alternative embodiments can use other types of processing operations to provide efficient differential scanning of non-ancestor snapshots in conjunction with asynchronous replication. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different asynchronous replication processes for respective different consistency groups comprising different sets of storage volumes or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage systems 102 that are configured to control performance of one or more steps of the FIG. 2 process in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

In some implementations of the FIG. 2 process, the source and target storage systems comprise content addressable storage systems configured to maintain various metadata structures that are utilized in the differential scanning. Examples of metadata structures maintained by the source and target storage systems in illustrative embodiments include the logical layer and physical layer mapping tables described below. It is to be appreciated that these particular tables are only examples, and other tables or metadata structures having different configurations of entries and fields can be used in other embodiments.

An address-to-hash ("A2H") utilized in some embodiments comprises a plurality of entries accessible utilizing logical addresses as respective keys, with each such entry of the A2H table comprising a corresponding one of the logical addresses, a corresponding hash handle, and possibly one or more additional fields.

A hash-to-data ("H2D") table utilized in some embodiments comprises a plurality of entries accessible utilizing hash handles as respective keys, with each such entry of the H2D table comprising a corresponding one of the hash handles, a physical offset of a corresponding one of the data pages, and possibly one or more additional fields.

A hash metadata ("HMD") table utilized in some embodiments comprises a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table may also include one or more additional fields.

A physical layer based ("PLB") table utilized in some embodiments illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Also, it is to be appreciated that terms such as "table" and "entry" as used herein are intended to be broadly construed, and the particular example table and entry arrangements described above can be varied in other embodiments. For example, additional or alternative arrangements of entries can be used.

In some embodiments, the storage system comprises an XtremIO™ storage array or other type of content addressable storage system suitably modified to incorporate functionality for differential scanning of non-ancestor snapshots in conjunction with an ongoing asynchronous replication process as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of a given one of the storage systems 102, and accordingly is assumed to be coupled to the other one of the storage systems 102 and to one or more host devices of a computer system within information processing system 100.

Although it is assumed that both the source storage system 102S and the target storage system 102T are content addressable storage systems in some embodiments, other types of storage systems can be used for one or both of the source storage system 102S and the target storage system 102T in other embodiments. For example, it is possible that at least one of the storage systems 102 in an illustrative embodiment need not be a content addressable storage system and need not include an ability to generate content-based signatures. In such an embodiment, at least portions of the differential scanning functionality of the one or more storage systems can be implemented in a host device.

The storage controller 408 in the present embodiment is configured to implement functionality for efficient differential scanning of non-ancestor snapshots of the type previously described in conjunction with FIGS. 1 through 3. For example, the content addressable storage system 405 illustratively participates as a source storage system in an asynchronous replication process with a target storage system that may be implemented as another instance of the content addressable storage system 405.

The storage controller 408 includes distributed modules 412 and 414, which are configured to operate in a manner similar to that described above for respective corresponding replication control logic 112 and snapshot generators 114 of the storage controllers 108 of system 100. Module 412 is more particularly referred to as distributed replication control logic, and illustratively comprises multiple replication control logic instances on respective ones of a plurality of distinct nodes. Module 414 is more particularly referred to as a distributed snapshot generator, and illustratively comprises multiple snapshot generation instances on respective ones of the distinct nodes.

Figure 4:
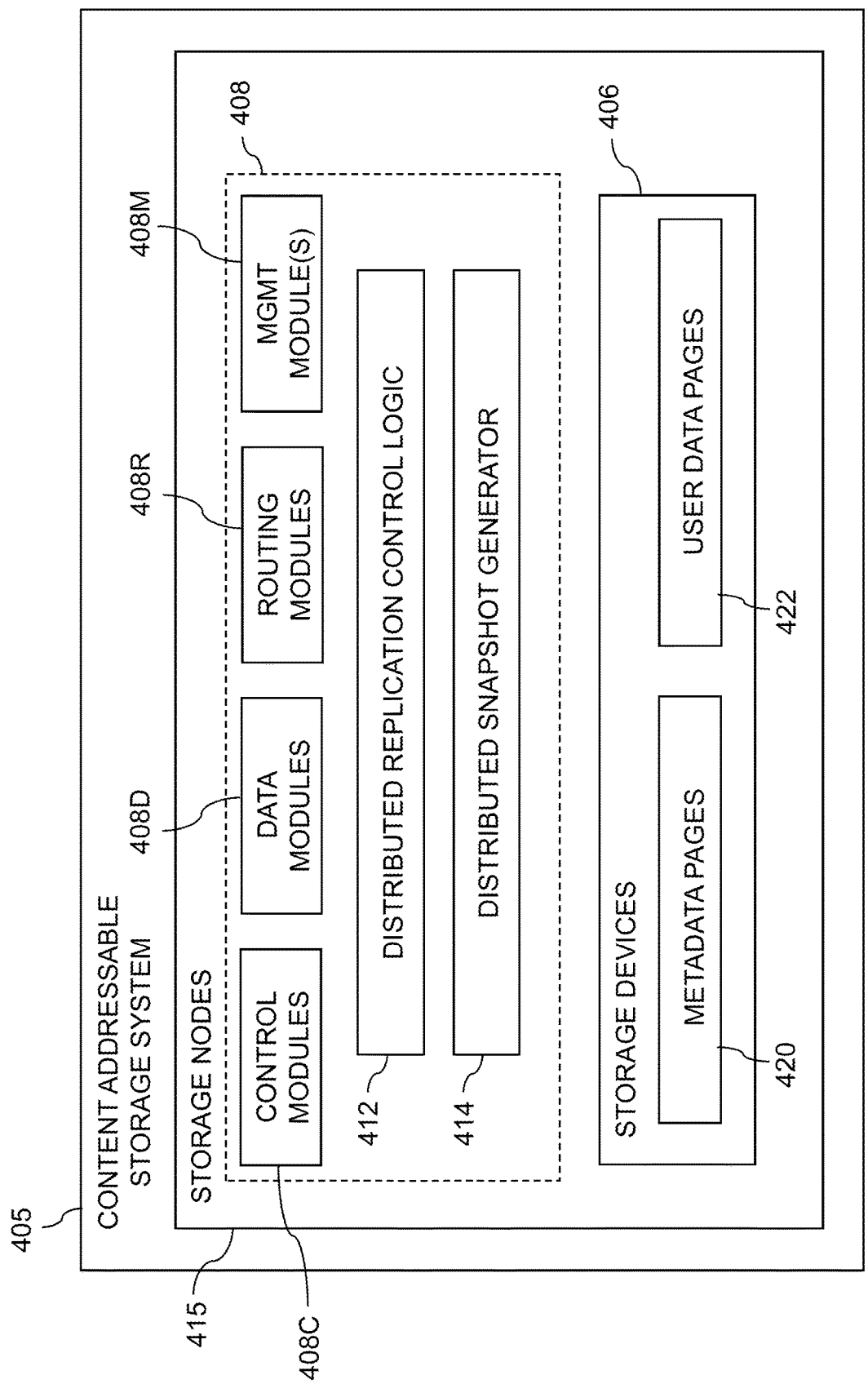
FIG. 4 shows a content addressable storage system having a distributed storage controller configured with functionality for differential scanning of non-ancestor snapshot pairs in asynchronous replication in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 is referred to as distributed storage controller 408.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415. A given set of processing modules implemented on a particular one of the storage nodes 415 therefore illustratively includes at least one control module 408C, at least one data module 408D and at least one routing module 408R, and possibly a management module 408M.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the differential scanning functionality of the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The differential scanning functionality provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a replication control logic instance that engages corresponding replication control logic instances in all of the control modules 408C and routing modules 408R in order to implement an asynchronous replication process.

In some embodiments, the content addressable storage system 405 comprises an XtremIO™ storage array suitably modified to incorporate differential scanning functionality as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, differential scanning functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 405. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments were described above in conjunction with FIG. 2. These particular examples include respective A2H, H2D, HMD and PLB tables. In some embodiments, the A2H and H2D tables are utilized primarily by the control modules 408C, while the HMD and PLB tables are utilized primarily by the data modules 408D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 405. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement differential scanning functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with differential scanning functionality as disclosed herein can provide a number of significant advantages relative to conventional arrangements.

For example, some embodiments allow efficient differential scanning to be performed even in those situations in which a first node of a snapshot tree is not an ancestor of a second node of the snapshot tree. This includes situations in which one or more storage volumes of a consistency group are "refreshed" or otherwise restored to previous versions during an ongoing asynchronous replication process, using what is also referred to herein as "live" restoration of the one or more storage volumes.

Accordingly, illustrative embodiments can provide efficient differential scanning between any two snapshots in a snapshot tree, regardless of whether or not the two snapshots are an ancestor snapshot pair or a non-ancestor snapshot pair.

Such arrangements therefore avoid the need to terminate and subsequently restart the replication process in order to restore one or more storage volumes of a consistency group using previous versions.

In some embodiments, the source and target storage systems are illustratively implemented as respective content addressable storage systems, but in other embodiments one or more of the storage systems can instead be a traditional storage array, which does not support any type of content addressable storage functionality, with any missing functionality being provided by a host device.

Accordingly, functionality for differential scanning of non-ancestor snapshot pairs in asynchronous replication as disclosed herein can be implemented in a storage system, in a host device, or partially in a storage system and partially in a host device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with differential scanning functionality will now be described in greater detail with reference to FIGS. 5 and 6. Although described in the context of system 100, these platforms may also be used to implement at least portions of other information processing systems in other embodiments.

Figure 5:
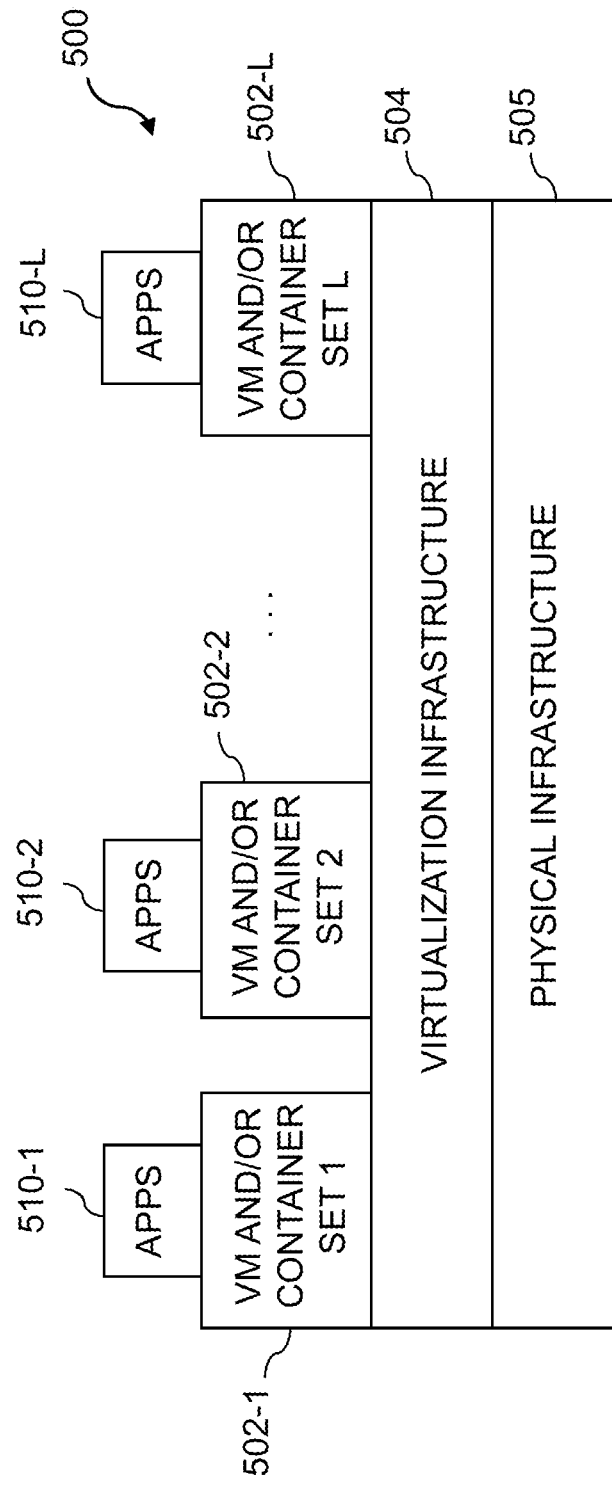
FIGS. 5 and 6 show examples of processing platforms that may be utilized to implement at least a portion of an information processing system in illustrative embodiments.
Figure 6:
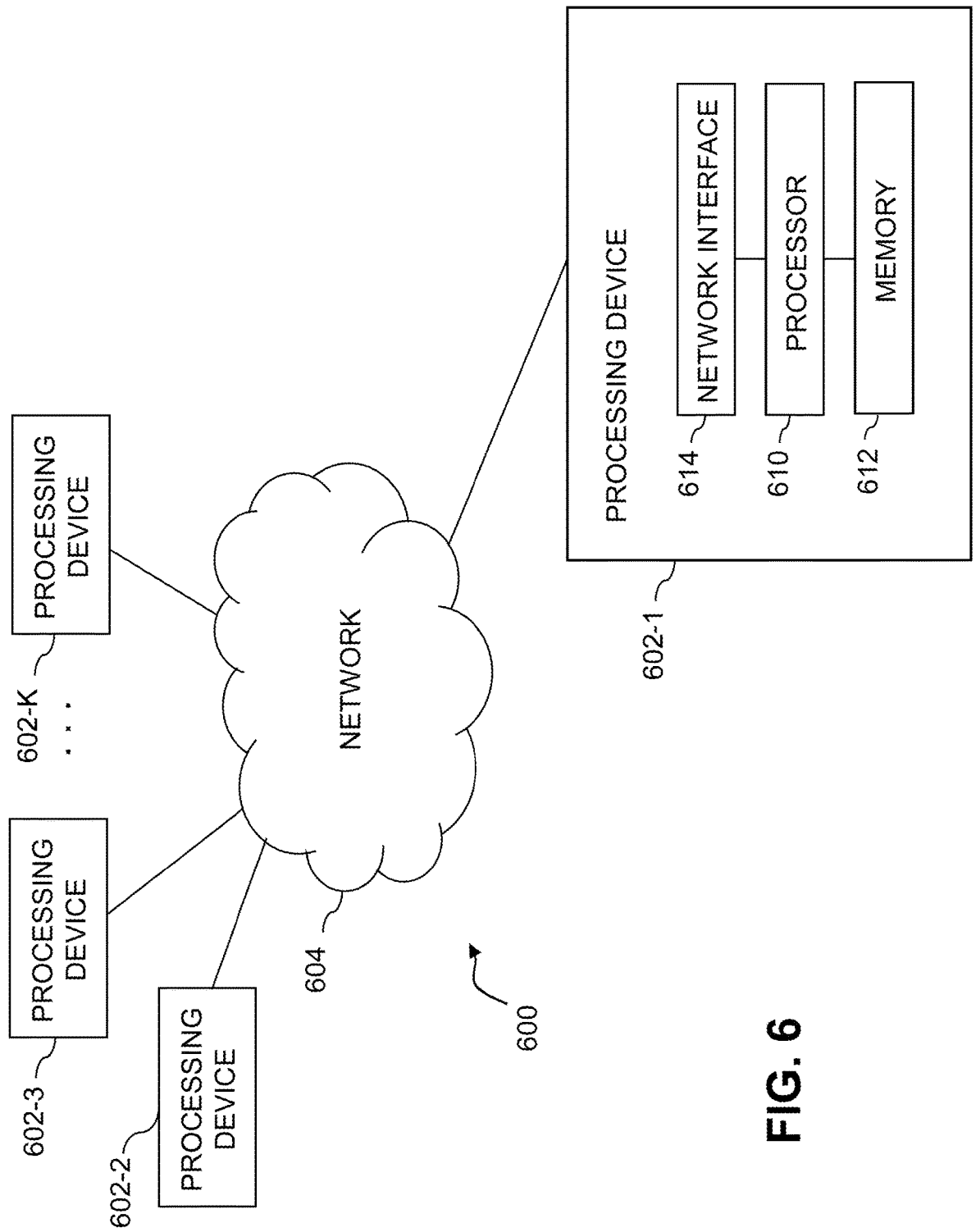

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide differential scanning functionality of the type described above for one or more processes running on a given one of the VMs. For example, each of the VMs can implement replication control logic and/or snapshot generators for providing differential scanning functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide differential scanning functionality of the type described above. For example, a container host device supporting multiple containers of one or more container sets can implement one or more instances of replication control logic and/or snapshot generators for providing differential scanning functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the differential scanning functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, asynchronous replication processes, snapshot generators and associated control logic and metadata structures. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to generate a current snapshot set for a consistency group comprising a plurality of storage volumes subject to replication from a source storage system to a target storage system;
   to schedule a differential scan of the current snapshot set relative to a previous snapshot set generated for the consistency group;
   for each of one or more snapshot trees maintained for the consistency group:
   to determine if a first node corresponding to the previous snapshot set is an ancestor of a second node corresponding to the current snapshot set; and
   to alter a manner in which an instance of the differential scan is performed for the snapshot tree responsive to a result of the determination.

2. The apparatus of claim 1 wherein said at least one processing device is implemented at least in part within the source storage system.

3. The apparatus of claim 2 wherein said at least one processing device comprises at least a portion of a storage controller of the source storage system.

4. The apparatus of claim 1 wherein the storage volumes comprise respective logical storage volumes each comprising at least a portion of a physical storage space of one or more storage devices.

5. The apparatus of claim 1 wherein the replication of the consistency group comprises asynchronous replication of the consistency group carried out over a plurality of asynchronous replication cycles and wherein scheduling the differential scan comprises scheduling the differential scan for a given one of the replication cycles.

6. The apparatus of claim 5 wherein the instance of the differential scan is performed in the given replication cycle of the asynchronous replication of the consistency group.

7. The apparatus of claim 5 wherein results of performing the instance of the differential scan are transmitted from the source storage system to the target storage system in the given replication cycle.

8. The apparatus of claim 1 wherein the current snapshot set is derived from a restored version of at least a portion of the consistency group such that the first node corresponding to the previous snapshot set is not an ancestor of the second node corresponding to the current snapshot set.

9. The apparatus of claim 1 wherein a given one of the snapshot trees corresponding to a particular one of the storage volumes comprises:
   a root node;
   one or more branch nodes; and
   a plurality of leaf nodes;

wherein a given one of the branch nodes represents a particular version of the storage volume from which a corresponding snapshot is taken;

wherein a first one of the leaf nodes which is a child of the given branch node represents a subsequent version of the storage volume; and wherein a second one of the leaf nodes which is a child of the given branch node comprises the corresponding snapshot providing a point-in-time copy of the particular version of the storage volume.

10. The apparatus of claim 9 wherein at least one of the first and second nodes comprises a branch node of the snapshot tree.

11. The apparatus of claim 1 wherein a given one of the snapshot trees is associated with one or more additional trees including at least one of:

a dirty tree that characterizes updates to logical addresses of the corresponding storage volume; and a hash tree comprising content-based signatures of respective ones of the logical addresses of the corresponding storage volume;

wherein the instance of the differential scan performed for the given snapshot tree comprises aggregating information of at least one of the dirty tree and the hash tree between designated nodes of the given snapshot tree.

12. The apparatus of claim 1 wherein determining if a first node corresponding to the previous snapshot set is an ancestor of a second node corresponding to the current snapshot set comprises:

inspecting a path from the second node towards a root node of the snapshot tree;

responsive to the first node being part of the path, determining that the first node is an ancestor of the second node; and responsive to the first node not being part of the path, determining that the first node is not an ancestor of the second node.

13. The apparatus of claim 1 wherein altering a manner in which an instance of the differential scan is performed for the snapshot tree responsive to a result of the determination comprises:

performing a first type of differential scan comprising aggregating node metadata of a path from the second node to the first node responsive to the first node being an ancestor of the second node; and performing a second type of differential scan different than the first type of differential scan responsive to the first node not being an ancestor of the second node.

14. The apparatus of claim 13 wherein the second type of differential scan comprises:

identifying a first path from the first node to a root node;
identifying a second path from the second node to the root node;
determining a lowest common ancestor between the first and second paths;
combining the first and second paths at the lowest common ancestor; and
aggregating node metadata of the combined first and second paths.

15. A method comprising:

generating a current snapshot set for a consistency group comprising a plurality of storage volumes subject to replication from a source storage system to a target storage system;

scheduling a differential scan of the current snapshot set relative to a previous snapshot set generated for the consistency group;

for each of one or more snapshot trees maintained for the consistency group:

determining if a first node corresponding to the previous snapshot set is an ancestor of a second node corresponding to the current snapshot set; and altering a manner in which an instance of the differential scan is performed for the snapshot tree responsive to a result of the determination;

wherein the method is implemented by at least one processing device comprising a processor coupled to a memory.

16. The method of claim 15 wherein altering a manner in which an instance of the differential scan is performed for the snapshot tree responsive to a result of the determination comprises:

performing a first type of differential scan comprising aggregating node metadata of a path from the second node to the first node responsive to the first node being an ancestor of the second node; and performing a second type of differential scan different than the first type of differential scan responsive to the first node not being an ancestor of the second node.

17. The method of claim 16 wherein the second type of differential scan comprises:

identifying a first path from the first node to a root node;
identifying a second path from the second node to the root node;
determining a lowest common ancestor between the first and second paths;
combining the first and second paths at the lowest common ancestor; and
aggregating node metadata of the combined first and second paths.

18. A computer program product comprising a non-transitory processor-readable storage medium having stored therein program code of one or more software programs, wherein the program code when executed by at least one processing device causes said at least one processing device:

to generate a current snapshot set for a consistency group comprising a plurality of storage volumes subject to replication from a source storage system to a target storage system;

to schedule a differential scan of the current snapshot set relative to a previous snapshot set generated for the consistency group;

for each of one or more snapshot trees maintained for the consistency group:

to determine if a first node corresponding to the previous snapshot set is an ancestor of a second node corresponding to the current snapshot set; and to alter a manner in which an instance of the differential scan is performed for the snapshot tree responsive to a result of the determination.

19. The computer program product of claim 18 wherein altering a manner in which an instance of the differential scan is performed for the snapshot tree responsive to a result of the determination comprises:

performing a first type of differential scan comprising aggregating node metadata of a path from the second node to the first node responsive to the first node being an ancestor of the second node; and performing a second type of differential scan different than the first type of differential scan responsive to the first node not being an ancestor of the second node.

20. The computer program product of claim 19 wherein the second type of differential scan comprises:
- identifying a first path from the first node to a root node;
- identifying a second path from the second node to the root node;
- determining a lowest common ancestor between the first and second paths;
- combining the first and second paths at the lowest common ancestor; and
- aggregating node metadata of the combined first and second paths.

* * * * *